March 23, 1965     F. C. JONES     3,174,168

SELF-ALIGNING TOOL HOLDER

Filed March 30, 1961

INVENTOR.
FREDERICK C. JONES
BY *Harry C. Hunts*
ATTORNEY

United States Patent Office 3,174,168
Patented Mar. 23, 1965

3,174,168
SELF-ALIGNING TOOL HOLDER
Frederick C. Jones, Anaheim, Calif., assignor to Frederick C. Jones and Jake C. Ferrante, doing business as Nu-Screw Machine Tools, a copartnership
Filed Mar. 30, 1961, Ser. No. 99,532
3 Claims. (Cl. 10—129)

This invention relates to tool holders and more particularly to tool holders of the floating or self-aligning type.

Today's machine tool industry is so highly automated and dependent upon mass production practices that each machine or tool must be extremely flexible and trouble-free in the performance of its work. This is particularly true in the performance of certain machining operations. For instance, what with the advent of multiple station automatic tools such as multiple spindle lathes and the like, it is desirable, if not necessary, to employ self-aligning tools or holders therefor to compensate for any minute inaccuracies in the operation of the lathe. This is particularly true as regards the second and succeeding operations on a given work piece, which operations must be accurately aligned with the results of a previous operation, as for instance, a drilled hole or the like. Such second or succeeding operations might be reaming, tapping, counterboring, or the like.

To be more specific, if a hole is drilled in a given work piece at the first station of a multiple station lathe, and the work piece is then moved to a second station where such hole is to be reamed or tapped, it is virtually impossible to position the work piece at said second staion such that the reaming or tapping tool will be in precise alignment with the previously drilled hole. To compensate for this, it is desirable to mount the tool in a flexible or floating manner such that it aligns itself with respect to the particular hole so that the tapping or reaming operation is proper and accurate in all particulars.

Devices heretofore available for this purpose have been subject to malfunction after only a reasonable amount of use, and even while in proper working order have been less than satisfactory.

In view of the foregoing, it is an object of the present invention to provide a tool holder which permits the tool to align itself with respect to the work piece.

Another object of this invention is to provide a tool holder which permits the tool to move laterally of the direction of relative movement of the tool and work piece while the axis of such tool is maintained parallel to such relative movement.

Another object is to provide a tool holder as characterized above which enables the tool to be laterally offset from the holder, there being fastening means for retaining the tool in such offset position, if desired.

Another object is to provide a tool holder as characterized above which includes means for compensating for any lack of symmetry of the reverse movements of a given machine tool to facilitate removal of a tapping tool or the like.

Another object is to provide a tool holder as characterized above wherein lost motion means is provided to prevent damage to a tap or the threaded hole upon removal of a tapping tool.

Another object is to provide a tool holder as characterized above comprising a pair of relatively movable members, each of such members being provided with a flat coplanar surface normal to the direction of relative movement of the tool and the work piece, there being biasing means for retaining said flat surfaces in engagement to insure that the tool is always parallel to the direction of relative movement thereof with respect to said work piece.

Another object of this invention is to provide a tool holder as characterized above which is simple and inexpensive to manufacture, and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of a specific embodiment when read in connection with the accompanying drawing, in which FIGURE 1 is a perspective view of a multiple station lathe provided with tool holders according to the present invention;

Like reference characters indicate corresponding parts throughout the several views of the drawings.

Figure 1:
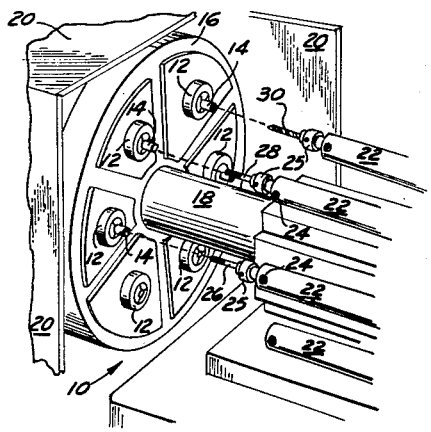
Figure 5:
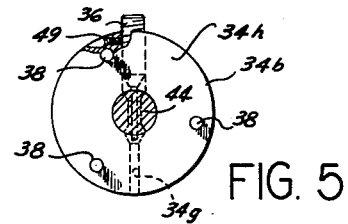
FIGURE 5 is a sectional view taken substantially along line 5—5 of FIGURE 3.

Referring to FIGURE 1 of the drawings, there is shown therein a portion of a six spindle turret lathe 10 provided with tool holders according to the present invention. Lathe 10 comprises six equally spaced chucks or collets 12, each of which is capable of holding a given work piece, as for instance piece 14, in a manner well understood by those persons skilled in the machine tool art. Each of chucks 12 is formed of three jaw segments which can be moved simultaneously toward or away from the center of the opening defined by such segments so as to grip or release the work piece 14 as required.

Each of the chucks 12 is fastened to a rotatable member 16 which is mounted on a shaft 18 and which is associated with automatic operating means (not shown) whereby the disc 16 may be rotated in specific steps to thereby provide the various stations of lathe 10. Since disc 16 is rotatable and may be associated with the usual cutting oils or compounds, lathe 10 comprises for the protection of the operator, sheet metal covers or shields as shown diagrammatically at 20.

To perform the various machine tool operations which may be required on a given work piece 14, there is provided a plurality of spindles 22 each of which is fastened to an appropriate stationary part (not shown) of the lathe, and is movable rectilinearly or axially with respect to the lathe, to thereby move a cutting tool into engagement with the respective work piece 14, as will hereinafter become more apparent.

Each of the spindles 22 is provided with a tool holder 25, according to the present invention, which is partially inserted into the respective spindle 22 and is retained therein by means of a setscrew 24. To emphasize the fact that the tool holder constituting the present invention is not limited to any particular type of machine tool or machining operation, FIGURE 1 shows a drill 26, a reamer 28, and a tap 30, each of which is individually mounted in a separate one of the tool holders 25.

A tool holder 25 comprises a spindle member 34 having an elongated shank or body portion 34a which is inserted within a complementally formed opening in the spindle 22, and an enlarged annular end portion 34b. As will become more apparent as the description of the instant invention proceeds, it is not necessary that the shank or main body portion 34a of spindle member 34 be cylindrical in shape, but rather, it may be of any appropriate cross-sectional configuration whereby the spindle member may be firmly held within a spindle 22 by means of the setscrew 24 or the like.

Spindle member 34 is further provided with a through opening 34c which is enlarged at 34d to provide an annular shoulder 34e. The through opening 34c in spindle member 34 should be formed coaxially of said member so that when the tool holder 25 is mounted within a spindle 22, rectilinear movement of the latter will effect axial movement of spindle member 34.

The annular shoulder or enlarged end portion 34b of spindle member 34 is formed with a through opening normal to the axis of member 34 to provide a pair of diametrically spaced openings 34f and 34g each of which communicates with the axial opening 34c therein. The opening 34f is provided with fastening threads to receive a suitably threaded setscrew 36, to be hereinafter described in greater detail, while opening 34g is permitted to remain free of fastening means. However, as will hereinafter become more apparent, either or both of the openings 34f and 34g may be provided with threads for receiving setscrew 36, and the size of such openings may be varied as desired without departing from the spirit and scope of the present invention.

The enlarged end portion 34b of spindle member 34 is provided with an extremely flat surface 34h which is machined at right angles to the axis of spindle member 34. Projecting from face 34h of member 34 are three guide pins 38. These pins cooperate with suitably formed openings in a tool holding member 40, provided with a central opening 40a which is of reduced size at one end due to an annular internal shoulder 40b. Tool holding member 40 is also provided with an extremely flat surface 40c for cooperation with surface 34h of spindle member 34 as will hereinafter appear in greater detail. Openings or apertures 40d for receipt of guide pins 38 are machined in member 40 at substantially right angles to the surface 40. Also, said member 40 is provided with a threaded opening 40e which receives a setscrew 42 for retaining a tool and bushing, if required, in the proper position within opening 40a.

To effectively interconnect tool holding member 40 and spindle member 34 there is provided a pin 44 having a shank or main body portion 44a which fits firmly but loosely within the opening 34c of spindle member 34. Pin 44 is provided with an enlarged end portion or head 44b which loosely fits within the opening 40a of tool holding member 40, said head 44b being too large to pass through the reduced end portion of opening 40a as provided by internal shoulder 40b. It should be noted that there is approximately the same amount of clearance between said shoulder 40b and the shank 44a of pin 44 as there is between the enlarged end 44b of pin 44 and the side walls of opening 40a. This clearance is also provided between the guide pins 38 and the respective holes 40d, the latter of which are drilled oversize with respect to pins 38 to provide the necessary amount of lost motion. This arrangement, of course, permits tool holding member 40 to move laterally with respect to pin 44, spindle member 34 and the respective spindle 22.

The action of the pins 38 within the openings 40d prevents the tool holding member 40 from tilting forward and causing misalignment between the axis of the tool within the tool holder and the direction of travel thereof as afforded by the respective spindle 22. This feature will become more apparent as the description of the embodiment chosen for illustration of the present invention proceeds, since it is dependent upon the means for retaining the surfaces 34h and 40c in firm engagement.

To retain such surfaces in engagement, there is provided biasing means in the form of a compression spring 46 and an adjustment screw 48; said compression spring being positioned between the shoulder 34e of spindle member 34 and the head 48a of adjusting screw 48. Screw 48 is threadedly positioned within a suitable opening 44c in pin 44. Thus, the force of spring 46 urges pin 44 within spindle member 34 so that the head 44b of pin 44 is thereby held in engagement with the annular internal shoulder 40b of tool holding member 40. This action, in turn, causes the surface 40c of member 40 to be held in firm engagement with the surface 34h of spindle member 34. In this manner, tool holding member 40 is always retained parallel to the respective spindle member 22 and due to the frictional forces between such surfaces will be retained in any offset position with respect to spindle member 34. Thus, the tool holding member and a tool positioned therein are flexible in that they are permitted to "float" laterally with respect to spindle member 34.

In the event it is desired to vary the frictional forces developed between the various parts to thereby vary the ease with which tool holding member 40 can move laterally with respect to spindle member 34, it is merely necessary to vary the engagement of adjusting screw 48 and pin 44. This, of course, varies the force of compression spring 46 in retaining member 40 in engagement with spindle member 34, and accordingly the frictional forces developed therebetween.

Figure 3:
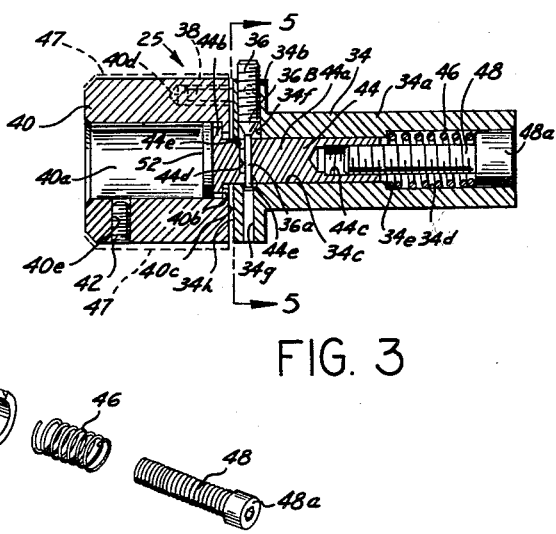
FIGURE 3 is an axial view of the tool holder of FIGURE 2.
Figure 2:
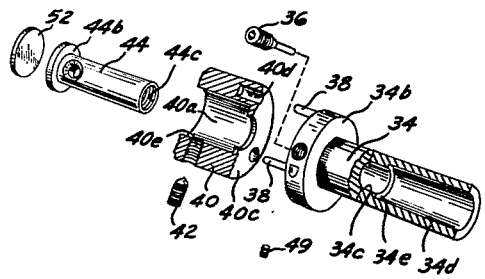
FIGURE 2 is a perspective exploded view of a tool holder according to the present invention.
Figure 4:
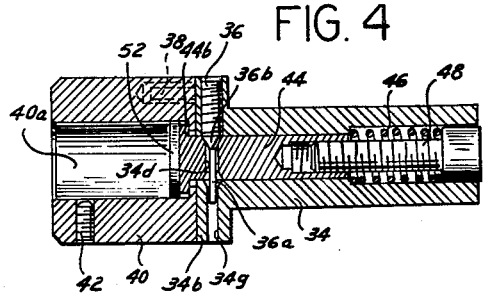
FIGURE 4 is a sectional view similar to FIGURE 3, except that the tool holder is fixed in a given offset position.

Pin 44 is also provided with a transverse through opening 44d which is provided at either end with a tapered or beveled portion 44e. Setscrew 36 is provided with an elongated reduced end portion 36a which fits very loosely within opening 44d so that even though setscrew 36 is positioned as shown in FIGURE 3 tool holding member 40 is permitted to move laterally with respect to spindle member 34. However, setscrew 36 is also provided with a tapered or beveled portion 36b which engages the tapered end portion 44e of opening 44d when setscrew 36 is caused to more completely engage the opening 34f of spindle member 34 as shown in FIGURE 4 of the drawings. Further movement of screw 36 causes pin 44 to be moved such as to increase the frictional forces between surface 40c of member 40 and surface 34h of member 34. Thus, a point is reached where such frictional forces are so high that the "floating" characteristic of tool holding member 40 is completely overcome and it is firmly held in a given position. It should be noted, however, that since all of the lost motion is between member 40 and pin 44 and that the above described locking action is between spindle member 34 and pin 44, setscrew 36 is to retain tool holding member 40 in a fixed position regardless of its offset relation to member 34. That is, member 40 may be positioned so that the tool is coaxial with respect to spindle member 34, or it may be positioned as shown by the dotted lines 45 and 47 of FIGURE 3. A lock screw 49 is provided to lock setscrew 36 in any desired position.

Figure 6:
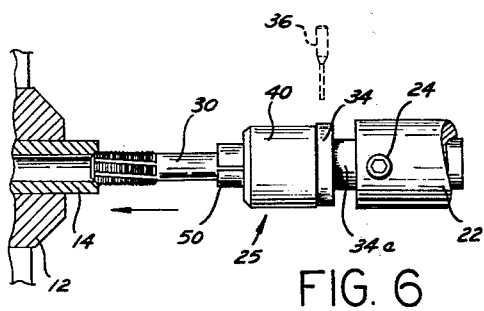
FIGURE 6 is a side elevational view of the tool holder moving a tapping tool toward a drilled hole in a work piece.
Figure 7:
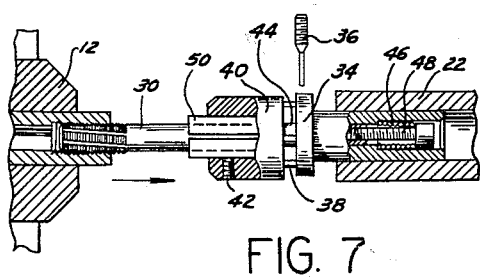
FIGURE 7 is a side elevational view of the tool holder, partly in section, shown removing the tapping tool from the hole in the work piece.

Referring more particularly to FIGURES 6 and 7 of the drawings, it is seen that a bushing 50 is employed around the shank of the tool which is to be held within member 40. In this way, it is possible to utilize a given holding member 40 for retaining tools of various sizes merely by changing the size of the bushing associated therewith. In order to prevent the tool and bushing from contacting the head 44b of pin 44, a solid washer 52 is press-fitted into opening 40a of member 40 to such a position as will permit relative movement between said head 44b and tool holding member 40.

The setscrew 42, of course, is used to firmly retain the tool and bushing 50 within the opening 40a of member 40.

As seen in FIGURE 6, as tapping tool 30 is brought toward the work piece 14 by means of tool holder 25 and spindle 22, it will automatically align or center itself with respect to the previously drilled hole in work piece 14 so that the resulting tapping operation will be coaxial with respect to such hole. This self-aligning characteristic is denoted in FIGURE 6 by virtue of the offset nature of tool holding member 40 with respect to spindle member 34. Referring to FIGURE 1 of the drawings, such tapping operation may be performed at the third station of the lathe after the hole has been drilled at the first station by drill 26 and reamed at the second stage by means of reamer 28. In the progression of work piece 14 from the first station to the second station and then to the third station of the lathe, there is likely to be certain inaccuracies in the advancing mechanism of disc 16 so that the self-aligning effect, as above described, would take place. It is also likely that this feature would become important at the second station to center the reamer 28 with respect to the previously drilled hole in work piece 14. As depicted by dotted lines in FIGURE 6 the setscrew 36 may be removed from within opening 34f of spindle member 34 throughout this self-aligning operation, since it is necessary that tool holding member 40 be permitted to "float" rather than to be rigidly fixed with respect to spindle member 34.

FIGURE 7 of the drawings shows the spindle 22 traveling in its reverse direction for removal of tap 30 from within the threaded hole in work piece 14. This operation, of course, also requires that the work piece be rotated in its reverse direction, but if the reverse linear movement of spindle 22 is not synchronized with respect to such reverse rotation of work piece 14, the threaded opening within such work piece will be damaged, or the tap 30 will be broken. However, the above described tool holder 25 eliminates the need for such synchronism by virtue of the lost motion connection between the tool holding member 40 and the spindle member 34. That is, as spindle 22 moves so as to retract tap 30, if the work piece 14 has not commenced its reverse rotation at the same instant, only the spindle member 34 will move with the spindle, the tool holding member 40 and the tool 30 remaining stationary until the latter is permitted to withdraw by retracing the threads it has just formed. This action too requires that the member 40 be "floating" with respect to member 34 so that the setscrew 36 may be removed if desired. However, in the event it is desired to limit the amount of relative axial movement between such members, it may be desirable to position setscrew 36 as shown in FIGURE 3.

Although the instant invention has been shown and described with respect to a multiple station turret lathe, and with respect to drilling, reaming, and tapping operations, it is readily realized that virtually any type of machine tool may employ the subject tool holder to advantage and that virtually any type cutting tool may be employed therein.

Although I have shown and described certain specific embodiments of my invention, I am well aware that many modifications thereof are possible. My invention, therefore, is not to be restricted except insofar as is necessitated by the prior art and by the spirit of the appended claims.

I claim:
1. A tool holder comprising in combination a rectilinearly movable spindle member having a spindle axis formed with a flat surface at right angles to said spindle axis, said spindle member being movable in a direction parallel to said spindle axis, a tool holding member provided with means for receiving and retaining a tool, said tool retaining means defining an axis in said tool member, said tool holding member being formed with a surface at right angles to said axis of said tool holding member, and interconnecting means for maintaining the surface of said holding member in parallel engagement with the surface of said spindle member whereby said axes are maintained parallel and the tool in said holding member is maintained parallel to the direction of travel thereof regardless of its lateral position with respect to said spindle member, and wherein said interconnecting means comprises a pin in engagement with said spindle member and with said tool holding member, said pin engaging an axial surface on said spindle member so that they are axially free and radially fixed with respect to one another, said pin engaging a radial surface on said tool holding member so that they are axially fixed and radially free with respect to each other, said pin passing through an enlarged hole in said tool holding member so that said tool holding member is radially unrestrained by said pin, said interconnecting means further including means to prevent relative rotation of said spindle member and said tool holding member, and adjustable biasing means connected between said pin and said spindle member for urging said pin with respect to said spindle member to urge said right angular surface of said spindle member in engagement with said right angular surface of said tool holding member so that the frictional force between said right angular surface can be varied.

2. A tool holder according to claim 1 wherein said relative rotation preventing means includes at least two laterally spaced, axially positioned pins in engagement with both of said members to prevent relative rotation therebetween.

3. A tool holder according to claim 2 wherein each of said pins is inserted in an oversized hole in at least one of said members whereby lateral rectilinear movement is permitted between said members while relative rotation therebetween is prevented.

References Cited by the Examiner
UNITED STATES PATENTS

| 985,690 | 2/11 | Niedhemmer | 10—89 |
| 2,475,386 | 7/49 | Frisco | 279—16 |
| 2,807,812 | 10/57 | Wozniak | 10—129 |

ANDEW R. JUHASZ, *Primary Examiner.*
CARL W. TOMLIN, *Examiner.*